US011959391B2

(12) United States Patent
Stupariu-Cohan

(10) Patent No.: US 11,959,391 B2
(45) Date of Patent: Apr. 16, 2024

(54) METHOD FOR PROVISIONALLY ENSURING THE FUNCTIONAL CAPABILITY OF A DAMAGED HOUSING, AND HOUSING

(71) Applicant: Siemens Energy Global GmbH & Co. KG, Bayern (DE)

(72) Inventor: Sebastian Stupariu-Cohan, Mettmann (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/909,365

(22) PCT Filed: Feb. 18, 2021

(86) PCT No.: PCT/EP2021/053995

§ 371 (c)(1),
(2) Date: Sep. 3, 2022

(87) PCT Pub. No.: WO2021/185524

PCT Pub. Date: Sep. 23, 2021

(65) Prior Publication Data

US 2023/0087235 A1 Mar. 23, 2023

(30) Foreign Application Priority Data

Mar. 16, 2020 (DE) ..................... 10 2020 203 326.9

(51) Int. Cl.
*F01D 25/24* (2006.01)
*F01D 25/28* (2006.01)

(52) U.S. Cl.
CPC ............. *F01D 25/24* (2013.01); *F01D 25/28* (2013.01); *F05D 2230/80* (2013.01); *F05D 2260/31* (2013.01)

(58) Field of Classification Search
CPC ...... F01D 25/24; F01D 25/28; F05D 2230/80; F05D 2260/31
See application file for complete search history.

(56) References Cited

U.S. PATENT DOCUMENTS 3,241,813 A 3/1966 Flue
8,123,406 B2 * 2/2012 Erickson .................. F01D 9/06 415/176

(Continued)

FOREIGN PATENT DOCUMENTS

DE 1426808 A1 3/1969
EP 2336551 A2 6/2011

(Continued)

OTHER PUBLICATIONS

Machine translation of WO-2009021951-A1, Gossmann O, published Feb. 19, 2009 (Year: 2009).*

(Continued)

*Primary Examiner* — David E Sosnowski
*Assistant Examiner* — Jason G Davis
(74) *Attorney, Agent, or Firm* — Wolter Van Dyke Davis, PLLC

(57) ABSTRACT

A method for provisionally ensuring the functional capability of a housing of a machine in the event of damage to the housing, the housing having a housing upper part and a housing lower part, which are detachably fastened to each other by housing flanges and by threaded bolts that extend through the housing flanges and are secured by nuts, the damage to the housing being at least one crack in one of the housing parts, which extends toward the other housing part. The housing is reinforced by support plates, which are each fastened to the outside of the housing flanges. A housing is reinforced by support plates of this type.

17 Claims, 5 Drawing Sheets

(56) References Cited

U.S. PATENT DOCUMENTS

| | | | | |
|---|---|---|---|---|
| 9,822,664 | B1 * | 11/2017 | Kush | F01D 25/30 |
| 2011/0135492 | A1 | 6/2011 | Tetambe et al. | |
| 2013/0011253 | A1 * | 1/2013 | Mulcaire | F01D 25/265 415/214.1 |
| 2019/0093692 | A1 * | 3/2019 | Jarzebowski | B23P 6/045 |

FOREIGN PATENT DOCUMENTS

| | | | | |
|---|---|---|---|---|
| EP | 2543828 | A2 | 1/2013 | |
| JP | 2009024631 | A | 2/2009 | |
| WO | WO-2009021951 | A1 * | 2/2009 | F01D 25/243 |

OTHER PUBLICATIONS

PCT International Search Report and Written Opinion of International Searching Authority dated Jun. 5, 2021 corresponding to PCT International Application No. PCT/EP2021/053995 filed Feb. 18, 2021.

* cited by examiner

METHOD FOR PROVISIONALLY ENSURING THE FUNCTIONAL CAPABILITY OF A DAMAGED HOUSING, AND HOUSING

CROSS REFERENCE TO RELATED APPLICATIONS

This application is the US National Stage of International Application No. PCT/EP2021/053995 filed 18 Feb. 2021, and claims the benefit thereof. The International Application claims the benefit of German Application No. DE 10 2020 203 326.9 filed 16 Mar. 2020. All of the applications are incorporated by reference herein in their entirety.

FIELD OF INVENTION

The invention relates to a method for provisionally ensuring the functional capability of a housing of a machine, in particular a gas turbine, a steam turbine or a generator of a power plant, in the event of damage to the housing, wherein the housing has a housing upper part and a housing lower part, which are detachably fastened to one another by means of housing flanges and by means of threaded bolts that extend through the housing flanges and are secured by means of nuts, and wherein the damage to the housing is at least one crack which is present in one of the housing parts and extends toward the other housing part. The invention furthermore relates to a housing of a machine, in particular a gas turbine, a steam turbine or a generator of a power plant, which housing has a housing upper part and a housing lower part, which are detachably fastened to one another by means of housing flanges and by means of threaded bolts that extend through the housing flanges and are secured by means of nuts, wherein at least one housing part has a crack which extends toward the other housing part.

BACKGROUND OF INVENTION

Machine housings having a housing upper part and a housing lower part, which are detachably fastened to one another by means of housing flanges and by means of threaded bolts extending through the housing flanges and are secured by nuts, are known in principle in the prior art in a wide variety of configurations and are used, inter alia, as housings for gas turbines, steam turbines and/or generators of power plants. In these applications, housings are subject to high stresses during operation, and these may lead to crack formation in the housing. If one of the housing parts has a crack which extends toward the other housing part, it may, over the short or long term, compromise the load-bearing capacity of the housing and thus the functional capability of the entire machine. Against this background, it is normally determined computationally when, on the basis of a predetermined crack growth, the failure of the housing is to be expected in order to determine an earlier point in time for the replacement of the damaged housing part or of the damaged housing parts. In cases where a new housing part cannot be delivered by this time, the machine must be shut down for safety reasons, and this often leads to the shutdown of the entire power plant.

SUMMARY OF INVENTION

Proceeding from this background art, it is an object of the present invention to prevent such a shutdown of a machine.

To achieve this object, the present invention provides a method for provisionally ensuring the functional capability of a housing of a machine, in particular a gas turbine, a steam turbine or a generator of a power plant, in the event of damage to the housing, wherein the housing has a housing upper part and a housing lower part, which are detachably fastened to one another by means of housing flanges and by means of threaded bolts that extend through the housing flanges and are secured by means of nuts, and wherein the damage to the housing is at least one crack which is present in one of the housing parts and extends toward the other housing part, comprising the following steps: a) removing the threaded bolts extending through the housing flanges; b) positioning a respective metallic support plate on the outer side of each housing flange in such a way that holes of a hole pattern of the respective support plate are brought into alignment with the holes of a hole pattern of the associated housing flange, which are provided for receiving the threaded bolts; and c) fastening the housing upper part to the housing lower part using threaded bolts and nuts in such a way that the threaded bolts each extend through a housing flange of the housing upper part, a housing flange of the housing lower part and through the support plates arranged on the outer sides thereof. The support plates which are provided according to the invention on the outer sides of the housing flanges, ensure that the housing retains a certain residual stability, even if the at least one crack severs one of the housing parts, since the support plates stabilize the housing parts in themselves and the connection between the housing parts. In this way, after a crack has been detected, it is possible to bridge the time required for the production and/or delivery of a new housing part without running the risk of having to take the machine out of operation owing to the lack of stability of the housing. If a housing is made of a particularly brittle material, support plates according to the invention can also be installed even before a crack arises in order to ensure a residual stability of the housing in the event of a brittle fracture.

Advantageously, each support plate extends over at least 50% of the total length of the associated housing flange, as a result of which particularly good stability is achieved.

The thickness of the support plates is advantageously at least 6 mm. Such a minimum thickness has proven to be very reliable.

According to one embodiment of the present invention, spacers are positioned between each support plate and the associated housing flange. With such spacers, unevennesses of the outer surface of the housing flanges can be compensated in an effective manner.

The spacers are advantageously of annular design and are arranged in such a way that the threaded bolts extend through them. Accordingly, the spacers can be installed easily. The number of spacers is advantageously twice as large as the number of threaded bolts connecting the housing flanges to one another. In other words, two spacers are provided for each threaded bolt, which spacers are positioned opposite one another between a support plate and a housing flange.

Furthermore, the present invention provides a housing of a machine, in particular a gas turbine, a steam turbine or a generator of a power plant, which housing has a housing upper part and a housing lower part, which are detachably fastened to one another by means of housing flanges and by means of threaded bolts that extend through the housing flanges and are secured by means of nuts, wherein at least one housing part has a crack which extends toward the other housing part, characterized in that a respective metallic support plate is arranged on the outer sides of each housing flange in such a way that holes of a hole pattern of the respective support plate coincide with holes of a hole pattern of the associated housing flange which are provided for receiving the fastening means, and that the threaded bolts each extend through a housing flange of the housing upper part, a housing flange of the housing lower part and through the support plates arranged on the outer sides thereof.

Each support plate advantageously extends over at least 50% of the total length of the associated housing flange.

The thickness of the support plates is advantageously at least 6 mm.

Spacers are advantageously positioned between each support plate and the associated housing flange.

According to one embodiment of the present invention, the spacers are of annular design and are arranged in such a way that the threaded bolts extend through them, wherein the number of spacers is advantageously twice as large as the number of threaded bolts connecting the housing flanges to one another.

BRIEF DESCRIPTION OF THE DRAWINGS

Further features and advantages of the present invention will become clear from the following description of a method according to an embodiment of the present invention with reference to the appended drawing. In the drawing.

DETAILED DESCRIPTION OF INVENTION

Figure 1:
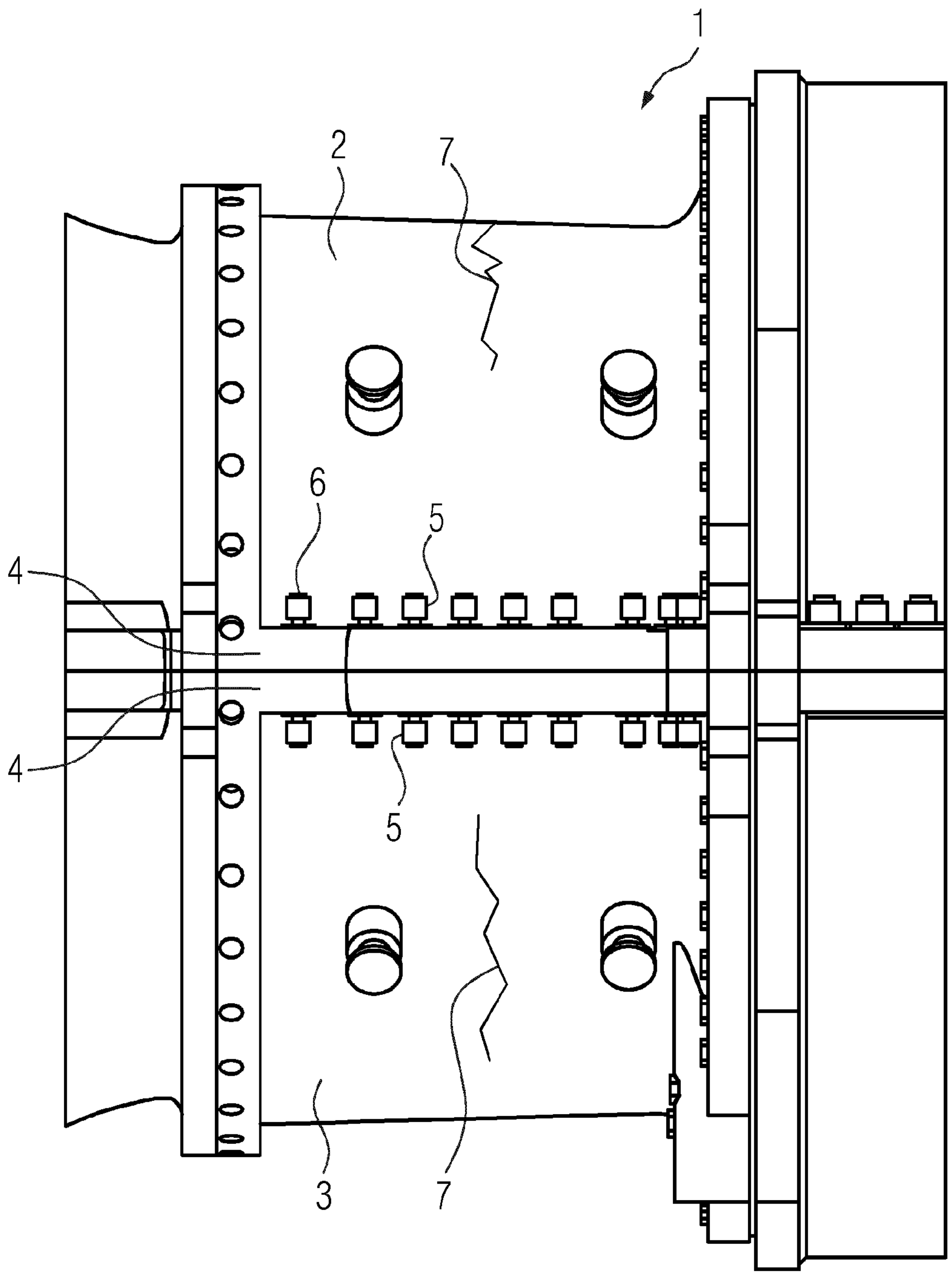
FIG. 1 is a schematic side view of a housing of a machine.

FIG. 1 shows a housing 1 of a machine, which may in principle be a gas turbine, a steam turbine or a generator of a power plant, to name a few examples. The housing 1 comprises a housing upper part 2 and a housing lower part 3, which are detachably fastened to one another by means of housing flanges 4, which are formed integrally with the housing parts 2, 3, and by means of threaded bolts 6 that extend through the housing flanges and are secured by means of nuts 5. Both housing parts 2, 3 have a crack 7 which extends toward the other housing part 3, 2. As a result of these cracks 7, the load-bearing capacity of the housing 1 is compromised over the short or long term.

Figure 2:
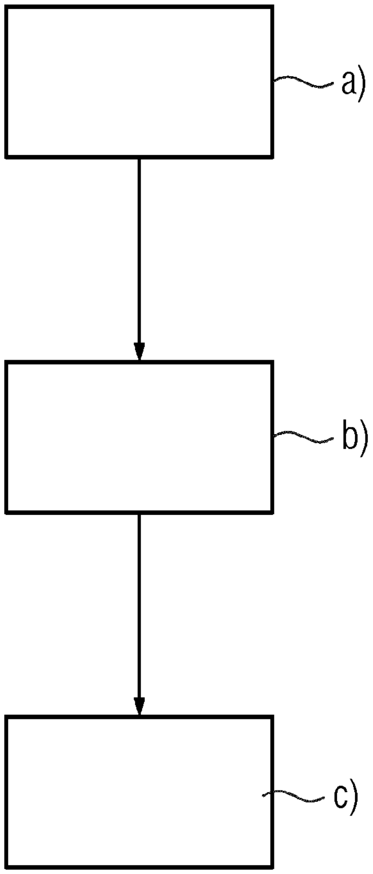
FIG. 2 is a flow diagram of a method according to one embodiment of the present invention.

FIG. 2 shows a method according to one embodiment of the present invention, which is used to temporarily and thus provisionally ensure the load-bearing capacity or stability of the housing 1, in order in particular to bridge a period of time until a new housing upper part 2 and a new housing lower part can be produced and/or delivered to replace the old housing parts 2, 3.

In a first method step a), the threaded bolts 6 extending through the housing flanges 4 are removed and the connection between housing parts 2 and 3 is thus released.

Figure 3:
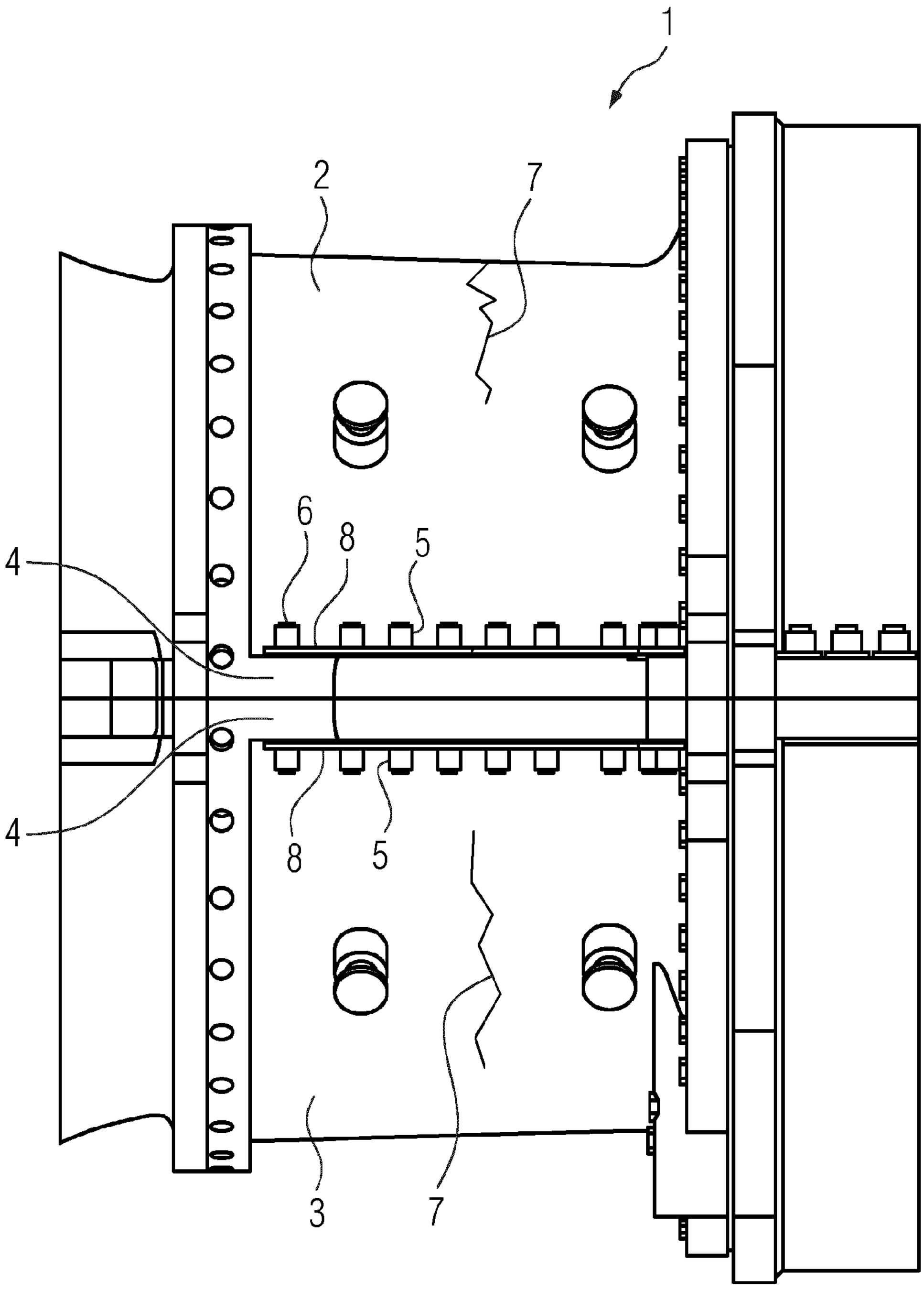
FIG. 3 is a schematic side view of the housing illustrated in FIG. 1 after carrying out the method illustrated in FIG. 2.
Figure 4:
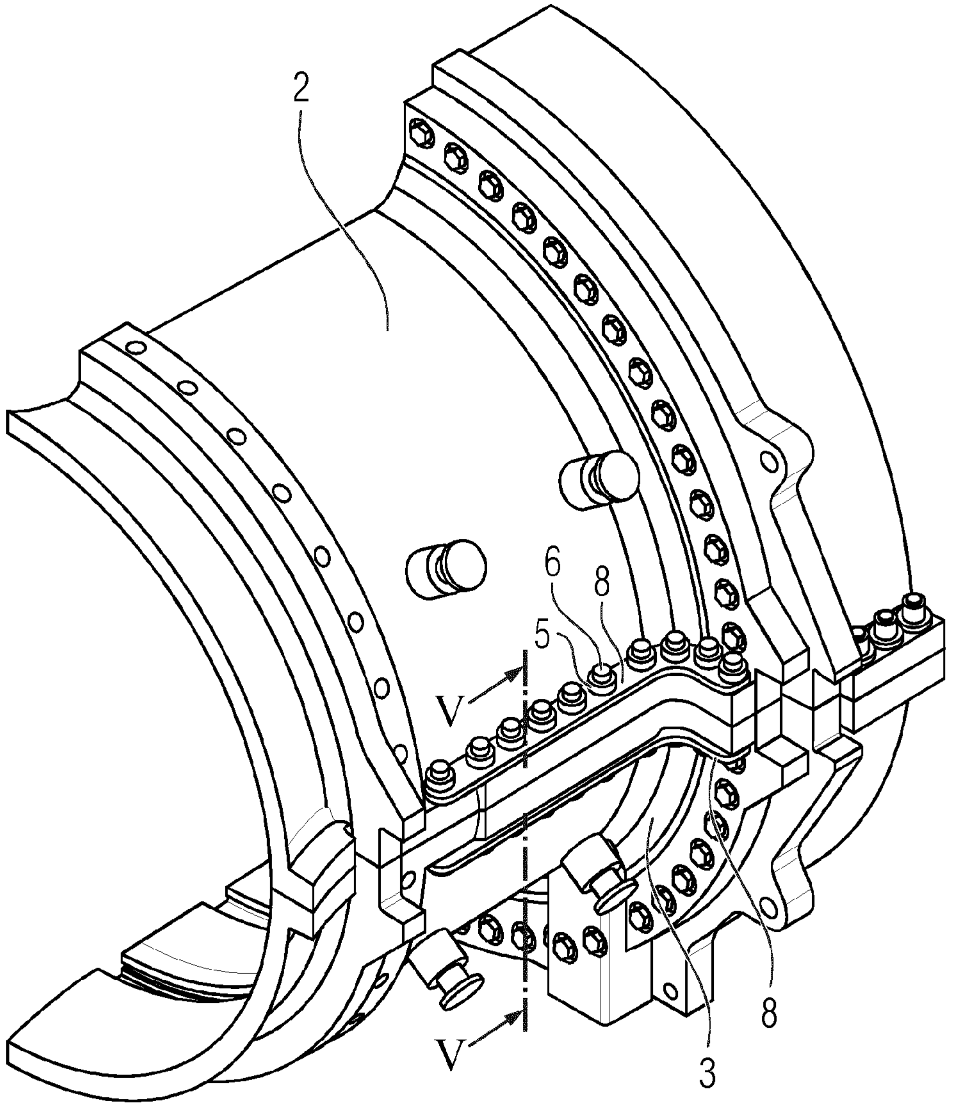
FIG. 4 is a perspective partial view of the housing shown in FIG. 3.
Figure 5:
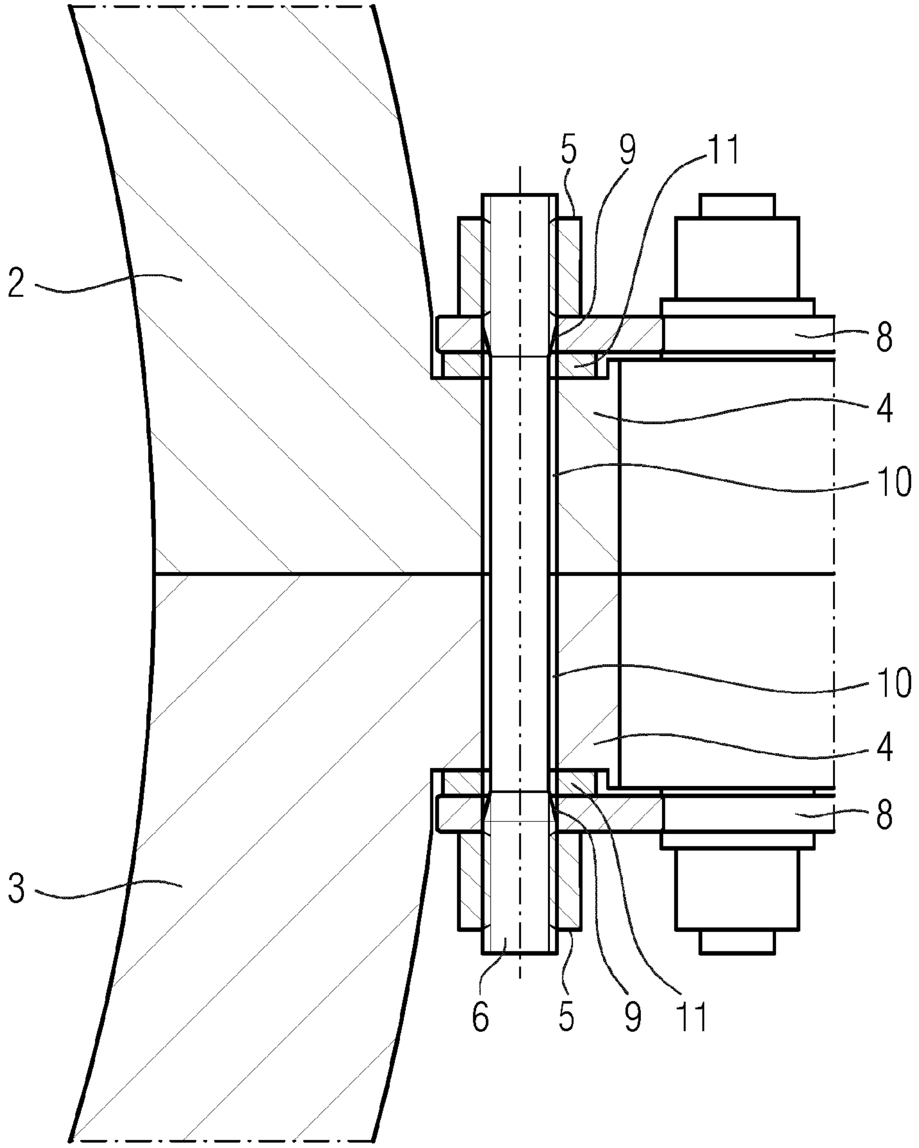
FIG. 5 is an enlarged sectioned view of the detail V in FIG. 4.

In a subsequent step b), as shown in FIGS. 3 to 5, a respective metallic support plate 8 is positioned on the outer side of each housing flange 4 in such a way that holes 9 of a hole pattern of the respective support plate 8 are brought into alignment with the holes 10 of a hole pattern of the associated housing flange 4, which are provided for receiving the threaded bolts 6. In the present case, the four support plates 8 have a thickness of at least 6 mm. The length and shape of the respective support plates 8 are selected in such a way that they cover at least the region of the respective cracks 7. For safety's sake, each support plate 8 can, as in the present case, extend over at least 50% of the total length of the associated housing flange 4.

In a further step c), the housing upper part 2 is fastened to the housing lower part 3 using threaded bolts 6 and nuts 5 in such a way that the threaded bolts 6 each extend through a housing flange 4 of the housing upper part 2, a housing flange 4 of the housing lower part 3 and through the support plates 8 arranged on the outer sides thereof. During this process, additional spacers 11 are advantageously positioned between the support plates 8 and the housing flanges 4. In the present case, the spacers 11 are of annular design and are arranged in such a way that the threaded bolts 6 extend through them. Here, the number of spacers 11 is advantageously twice as large as the number of threaded bolts connecting the housing flanges to one another. Thus, two spacers 11 are provided for each threaded bolt 6, which spacers are positioned opposite one another between a support plate 8 and a housing flange 4.

The arrangement produced in this way is distinguished by the fact that, on the one hand, housing parts 2 and 3 are each stabilized in themselves by the support plates 8. On the other hand, the support plates 8 also stabilize the connection between the two housing parts 2 and 3. Overall, the load-bearing capacity of the housing 1 is thus ensured at least temporarily, even if one of the cracks 7 or both cracks 7 completely severs the associated housing part 2, 3.

At this point, it should be pointed out that the method according to the invention can also be carried out if no cracking has yet occurred. If, for example, it subsequently turns out that a housing 1 has been produced from material which is too brittle, the support plates 8 can be mounted purely as a precautionary measure in case a brittle fracture occurs.

Although the invention has been illustrated and described more specifically in detail by means of the illustrative embodiment, the invention is not restricted by the examples disclosed, and other variations can be derived therefrom by a person skilled in the art without exceeding the scope of protection of the invention.

The invention claimed is:

1. A method for provisionally ensuring a functional capability of a housing of a machine, in the event of damage to the housing, wherein the housing has comprises a housing upper part and a housing lower part, which are detachably fastened to one another by housing flanges and by threaded bolts that extend through the housing flanges and are secured by nuts, and wherein the damage to the housing is at least one crack which is present in one of the housing parts and extends toward the other housing part, the method comprising:

a) removing the threaded bolts extending through the housing flanges;

b) positioning a respective metallic support plate comprising a plurality of support plate holes on an outer side of each housing flange in such a way that the plurality of support plate holes of the respective support plate are brought into alignment with a plurality of housing flange holes of of an associated housing flange provided for receiving the threaded bolts; and c) fastening the housing upper part to the housing lower part using threaded bolts and nuts in such a way that the threaded bolts each extend through the housing flange of the housing upper part, the housing flange of the housing lower part and through the support plates arranged on the outer sides thereof.

2. The method as claimed in claim 1, wherein each support plate extends over at least 50% of a total length of the associated housing flange.

3. The method as claimed in claim 1, wherein a thickness of the support plates is at least 6 mm.

4. The method as claimed in claim 1, wherein spacers are positioned between each support plate and the associated housing flange.

5. The method as claimed in claim 4, wherein the spacers are of annular design and are arranged in such a way that the threaded bolts extend through them.

6. The method as claimed in claim 5, wherein the number of spacers is twice as large as the number of threaded bolts connecting the housing flanges to one another.

7. The method as claimed in claim 1, wherein the machine comprises a gas turbine, a steam turbine, or a generator of a power plant.

8. The method of claim 1, further comprising detecting the at least one crack.

9. The method of claim 8, further comprising wherein a load-bearing capacity of the housing is compromised due to the at least one crack.

10. A housing of a machine, comprising:

a housing upper part and a housing lower part, which are detachably fastened to one another by housing flanges and by threaded bolts that extend through the housing flanges and are secured by nuts, and wherein at least one housing part comprises a crack which extends toward the other housing part, and a respective metallic support plate comprising a plurality of support plate holes which is arranged on outer sides of each housing flange in such a way that the plurality of support plate holes of the respective support plate coincide with housing flange holes of an associated housing flange which are provided for receiving the threaded bolts, and wherein the threaded bolts each extend through the housing flange of the housing upper part, the housing flange of the housing lower part and through the support plates arranged on the outer sides thereof.

11. The housing as claimed in claim 10, wherein each support plate extends over at least 50% of a total length of the associated housing flange.

12. The housing as claimed in claim 10, wherein a thickness of the support plates is at least 6 mm.

13. The housing as claimed in claim 10, further comprising:

spacers which are positioned between each support plate and the associated housing flange.

14. The housing as claimed in claim 13, wherein the spacers are of annular design and are arranged in such a way that the threaded bolts extend through them.

15. The housing as claimed in claim 14, wherein the number of spacers is twice as large as the number of threaded bolts connecting the housing flanges to one another.

16. The housing as claimed in claim 10, wherein the machine comprises a gas turbine, a steam turbine, or a generator of a power plant.

17. The housing as claimed in claim 10, wherein each housing flange defines an L-shape, wherein each support plate comprises a first extension and a second extension that together define a matching L-shape, and wherein support plate holes of the plurality of support plate holes are present through the first extension and through the second extension of each support plate.

* * * * *